Sept. 15, 1959 H. C. MILLER 2,904,688
CASSETTE AND HOLDER THEREFOR FOR BACK REFLECTION CAMERAS
Filed June 6, 1958 2 Sheets-Sheet 1
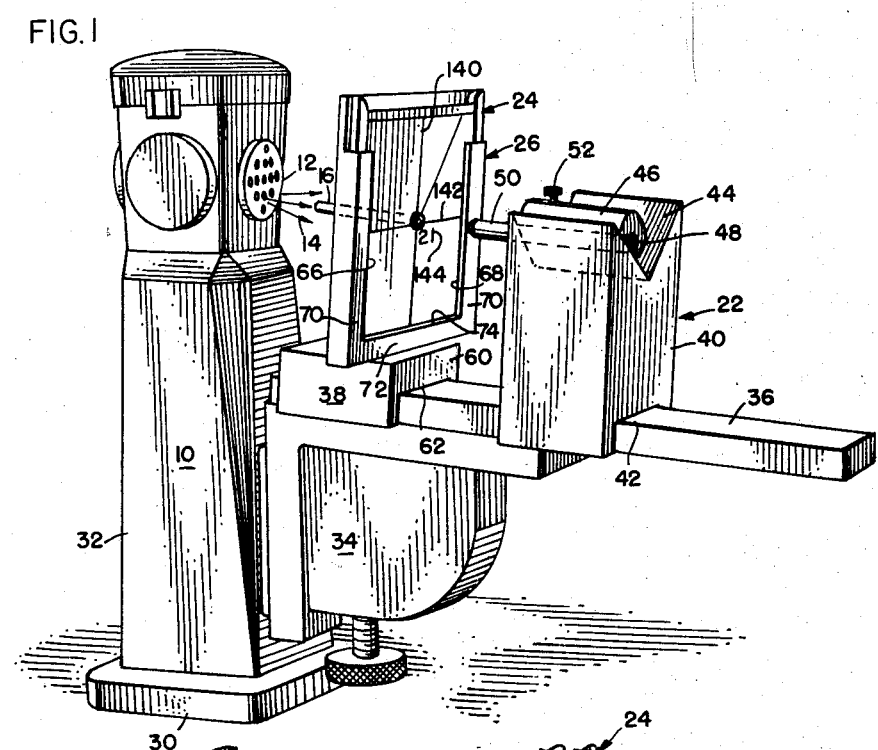
INVENTOR:
HAROLD C. MILLER
ATT'Y

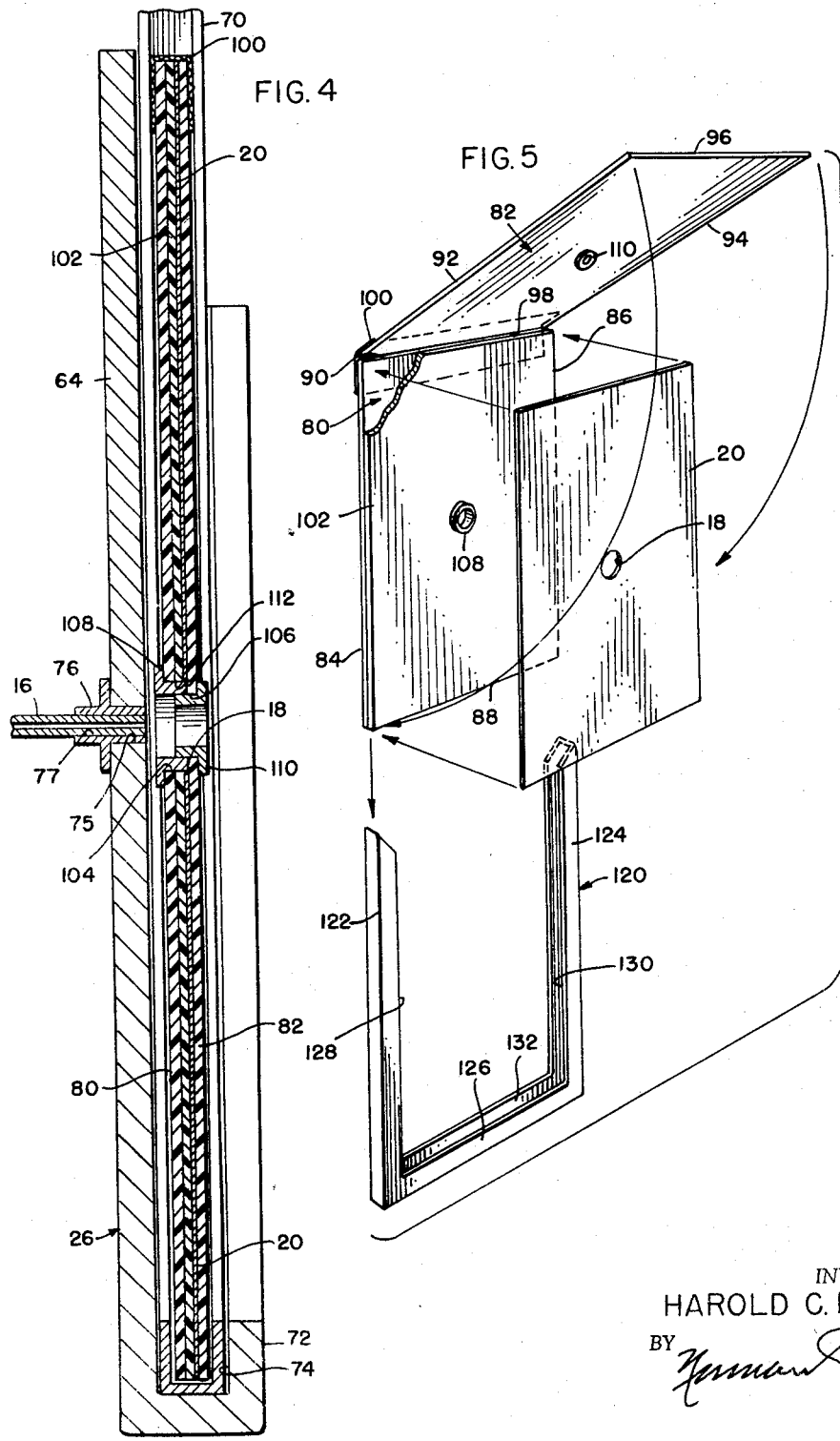

United States Patent Office 2,904,688
Patented Sept. 15, 1959

2,904,688

CASSETTE AND HOLDER THEREFOR FOR BACK REFLECTION CAMERAS

Harold C. Miller, Chicago, Ill., assignor to Super-Cut, Inc., Chicago, Ill., a corporation of Illinois Application June 6, 1958, Serial No. 740,494

11 Claims. (Cl. 250—68)

The present invention relates to cassettes for X-ray films and more particularly to a novel form of cassette designed for use in connection with back reflection X-ray methods of crystal orientation wherein a photographic record of the back reflection pattern of a diamond or other crystal is made preparatory to identification and reading of the pattern in terms of error angles by comparison with a Greninger chart so that the errors may be set into a goniometer which will bring the diamond to any desired orientation for transfer of the diamond from the temporary goniometer dop to a tool nib. Such a method of crystal orientation has been shown and described in my copending application Serial No. 669,492, filed July 2, 1957 for "Method of and Apparatus for Mounting Diamonds in Tool Shanks and Other Holders" and reference may be had to such application for a full disclosure of the method and consequently for a better understanding of the use to which the present invention may be put.

Briefly, it has long been recognized that a diamond offers varying resistance to abrasion, depending upon the particular relationship between the direction of abrasion across the compacting face of the stone and the crystallographic axes of the stone. Where a diamond is to perform useful work, for example, in dressing the peripheral or other surface of a grinding wheel, or where a diamond is to be worked upon, for example, where it is to be sawed into individual slabs, it is highly advantageous that the diamond be mounted in the tool shank or holder with its crystallographic axes so disposed relative to the axis of the tool shank that normal feeding of the shank will bring the stone into traversing register with the surface undergoing dressing so that abrasion will take place in a direction wherein the diamond is highly resistant to abrasion and cleavage. For accurate mounting of the diamond in the tool shank by the photographic method disclosed in my above-mentioned copending application, the deviation of an approximately oriented diamond on a temporary dop is ascertained by X-ray diffraction procedure and orientation of the temporary dop and its affixed diamond relative to a second dop is effected on the basis of such ascertained deviation, after which mechanical transfer of the diamond from the first dop to the second dop is effected while maintaining the two dops thus relatively oriented. Thereafter, a second mechanical transfer of the diamond from the second dop to a final mount while automatically preserving the corrected orientation of the stone by certain fiducial alignment procedure is carried out so that the finally mounted diamond will have the desired crystallographic orientation relative to the axis of the mount. Such procedure involves the use of special X-ray equipment whereby a photographic record of the back reflection pattern of the diamond may be obtained. This equipment consists essentially of an X-ray machine including a forwardly extending collimator tube, the forward end of which is in register with a central opening provided in the X-ray film. The X-rays issuing from the collimator tube pass through the central opening of the film, strike the diamond which is positioned forwardly of the film in alignment with the collimator tube, and are reflected backwardly to the film for exposure purposes. The film is enclosed in a film holder or cassette, together with the usual intensifying screen or screens on one or both sides of the film, and the cassette and the screen or screens are provided with central openings in register with the opening in the film so that the X-rays issuing from the collimator tube may pass completely through the cassette and film unobstructedly.

Heretofore, film and film holders of this general character have been more or less permanently associated each with the other in that, in order to mount the film-containing cassette in accurate register with the collimator tube and diamond, the cassette has been fixedly attached to a cassette support which is removably applied to a guide rail or other support associated with either the X-ray machine or the goniometer or other diamond supporting structure, or both.

The film holder or cassette, together with the support therefor are generally referred to as the camera, and heretofore, it has been the practice after making each exposure to remove the entire camera from the X-ray machine and carry the same to the dark room, after which the cassette is removed from the support, opened, the film removed and developed. During the time that the film is undergoing development, a new film may be inserted into the cassette, the cassette closed and secured to the holder, and the camera returned to the X-ray machine and mounted thereon preparatory to making the next exposure. Such individual processing of the X-ray films is time-consuming and greatly adds to the length of time which is required for the processing of any given parcel of diamonds. Efforts to speed up the processing of a large number of diamonds have naturally led to the use of multiple cassettes and cassette holders, i.e. multiple cameras. The use of multiple duplicate cameras is obviously expensive and, at best, regardless of the number of individual cameras employed, does not permit of collective handling of the films in the dark room since the shortest time involved between successive exposures is limited by the length of time it requires to mount and remove the various cameras on and from the X-ray machine and to disassemble them in the dark room.

The present invention is designed to overcome the above-noted limitations that are attendant upon the use of present day back reflection film holder equipment and, toward this end, it contemplates the provision of a novel camera including a composite cassette assembly and holder therefor wherein the holder may remain permanently associated with the X-ray machine and wherein the composite cassette assembly may be applied to and removed from the holder on the machine by the simple expedient of dropping the cassette assembly, so to speak, into position in a pair of vertically extending guide ways provided for it by the holder, the holder and cassette being so designed that after the cassette is brought into vertical register with the guide ways and released, the same will fall by gravity into a position of accurate register with the collimator tube and diamond undergoing X-ray photography without requiring the use of special fastening screws, clips, or other fastening devices. Removal of the cassette from the holder, after the necessary exposure has been made, is effected in a reverse manner by simply lifting the cassette from the holder, after which it may be transported to the dark room. The novel cassette assembly and holder therefor comprising the present invention makes possible a greatly simplified and expeditious processing procedure whereby a large number of diamonds may be photographed in rapid succession and the various X-ray films involved processed in the dark room simultaneously. Use of the cassette and holder of the present invention makes possible additional economies in the processing of film in that the phi and beta crystallographic axes of the X-ray pattern for subsequent register with similar axes on the Greninger chart are applied as X-ray-impervious lines on the cassette so that these lines may be photographed onto the film. Similarly and additionally, each cassette may carry an X-ray-impervious serial number corresponding to an identical serial number on the diamond supporting dop so that the various simultaneously developed films in the dark room need not be individually catalogued and may later be readily identified with respect to the particular diamond which has produced the back reflection pattern thereon.

The provision of a cassette and cassette holder for back reflection cameras of the character briefly outlined above being among the principal objects of the present invention, another object is to provide a cassette assembly which may be readily opened for film removal and closed for film enclosure by an extremely simple manual procedure without requiring the use of any tools whatsoever.

Another object of the invention is to provide a cassette assembly of this sort which, despite its simplicity of construction, makes various provisions or safeguards against the admission of light to the film at the various corners and edges thereof as well as in the region of the central collimator tube opening through the cassette.

Yet another object of the invention is to provide a cassette and cassette holder for back reflection cameras wherein the holder may be initially mounted in position on the X-ray machine for proper registry with the collimator tube and diamond undergoing photographing and retained permanently in such position with the collimator tube being maintained in an operative but out-of-the-way position wherein the cassette assembly may be slid into operative position and removed from such operative position without requiring withdrawal of the end of the collimator tube from the holder for clearance purposes.

Another object of the invention is to provide a casette assembly which cannot be enclosed around the X-ray film until the latter has been brought into accurate alignment with the collimator tube opening provided in the walls of the cassette and which, after closure about the film will serve to maintain the film in such accurate aligned position.

The provision of a cassette assembly for back reflection cameras which is extremely simple in its construction and which is comprised of a minimum number of parts and which therefore may be manufactured at a low cost; one which is rugged and durable and which therefore will withstand rough usage; and one which otherwise is well adapted to perform the services required of it are further desirable features which have been borne in mind in the production and development of the present invention.

With these and other objects in view, which will become more readily apparent as the following description ensues, the invention consists in the novel construction, combination and arrangement of parts shown in the accompanying two sheets of drawings.

In these drawings:

Fig. 1 is a perspective view of certain X-ray diffraction equipment including an X-ray machine and diamond-target supporting fixture, showing the improved cassette and cassette holder of the present invention operatively associated therewith;

Fig. 2 is an enlarged fragmentary side elevational view of a portion of the equipment shown in Fig. 1 with the cassette and cassette holder of the present invention shown in vertical cross section;

Fig. 3 is a front perspective view of a cassette assembly constructed in accordance with the principles of the present invention;

Fig. 4 is an enlarged sectional view taken substantially on the vertical plane indicated by the line 4—4 of Fig. 3; and Fig. 5 is an enlarged perspective exploded view of the structure shown in Fig. 3.

Referring now to the drawings in detail, and in particular to Figs. 1 and 2, an apparatus for making a photographic record of the back reflection pattern of a diamond according to the method disclosed in my copending application set forth above and including the improved cassette and cassette holder of the present invention has been somewhat schematically represented in these views. An X-ray machine is designated in its entirety at 10 and is provided with the usual X-ray tube 12 from which X-rays are caused to issue in diverging fashion as indicated at 14. A limited quantity of the X-rays 14 are collected by a collimator tube 16 and the rays issuing from the forward or outer end of tube (see also Fig. 4) pass through a central opening 18 provided in the X-ray film 20 and are caused to strike the diamond D, the crystallographic pattern of which is to be recorded on the film 20. The X-ray tube 12, film 20 and diamond D are appropriately spaced with the collimator tube 16, hole 18 and diamond D being disposed in axial alignment and the film 20 is adapted to receive Laue back reflection patterns issuing from the diamond. The diamond D is operatively supported by a fixture assembly which has been designated in its entirety at 22 while the film 20 is operatively mounted in a film holder or cassette 24 contained in a cassette holder 26, the cassette 24 and holder 26 being constructed in accordance with the principles of the present invention in a manner that will be set forth in detail presently.

The X-ray machine 12 includes a base 30 from which there extends upwardly a machine support 32 of generally pyramidal configuration and the front face of which has affixed thereto in any suitable manner a forwardly extending base casting or support 34 which carries at its upper end an elongated guide rail 36, the latter serving to adjustably support thereon a camera assembly 38 which includes the cassette 24 and cassette holder 26, as well as the fixture assembly 22.

The fixture assembly 22 and the manner in which it is adjustably mounted on the guide rail 36 forms no part of the present invention, such a fixture forming the subject matter of my copending application, Serial No. 740,468, filed June 6, 1958, for "Apparatus for Mounting Diamonds in Tool Shanks and Other Holders," and reference may be had to this application for a full disclosure of the details thereof. Briefly however, the fixture 22 is in the form of a block 40 having an undercut groove 42 therein in register with the rail 36, the groove 42 constituting a guideway by means of which the block 40 straddles the rail 36 and is supported thereon for longitudinal adjustment therealong so that the distance between the block and X-ray tube 12 may be adjusted. The upper end of the block 40 is provided with a V-rest 44 adapted to receive therein a block 46, the underneath surface of which is shaped conformably to the shape of the V-rest 44 so that the block 46, when positioned in the V-rest, in any position of adjustment therealong, will be maintained in axial alignment with the X-ray tube 12. The block 46 is in the form of a thick walled tube having an axially extending bore 48 therethrough, and in which bore there is telescopically received a diamond-carrying member 50, commonly known in the art as a "dop," the dop consisting of an elongated rod which projects rearwardly from the bore 48 and carries at its outer end the diamond D, the latter being affixed to the dop by a suitable adhesive such as shellac or the like. A set screw 52 threadedly received in the block 46 registers with an elongated V-shaped groove or flute 54 (Fig. 2) provided in the dop 50, the groove 54 constituting a fiducial reference whereby the dop and its contained diamond may, according to the photographic back reflection method, be accurately aligned in other pieces of equipment associated with the method and which form no part of the present invention.

The camera assembly 38 includes the present cassette assembly 24 and the holder 26 therefor. This camera assembly comprises a camera block 60 having an undercut groove 62 formed therein by means of which the block is mounted on and straddles the guide rail 36 so that it is adjustable therealong to vary the distance between the X-ray film 20 and the X-ray tube 12. The block 38 constitutes a base support for the cassette holder 26 which may be integral with the block. The holder 26 is in the form of a flat rectangular upstanding metal plate 64 of appreciable thickness and which extends in a transverse vertical plane across the upper face of the block 38. On the forward side of the plate 64 there are provided a pair of vertical opposed channel-shaped guideways 66 and 68 respectively, these guideways being provided by reentrant flanges 70 which are spaced forwardly from the plate 64. A similar reentrant flange 72 spaced forwardly of the plate, provides a pocket 74 at the bottom of the structure for reception therein of the lower edge of the cassette assembly 24. As shown in Figs. 1 and 4, the plate 64 projects upwardly above the upper ends of the channel-shaped guideways 66 and 68. The plate 64 is formed with a central opening or hole 75 therein (Fig. 4) and the hole 75 receives therein one end of a flanged nipple 76 having a central bore 77 extending therethrough and in which bore the forward end of the collimator tube is received. The nipple 76 constitutes the sole support for the collimator tube and serves to maintain the tube in operative register with the X-ray tube 12.

The cassette assembly 24 involves in its general organization two hingedly connected rectangular plates including a back plate 80 and a front plate 82. The back plate is provided with parallel side edges 84 and 86 respectively and parallel end edges 88 and 90 respectively. Similarly, the front plate 82 is provided with parallel side edges 92 and 94 respectively and end edges 96 and 98 respectively. The regions of the two plates 80 and 82 adjacent the edges 90 and 98 are hingedly connected together by a flexible hinge member 100 and this latter member may be in the form of a light-impervious strip of flexible tape which is applied to the plates 80 and 82 by a suitable adhesive. If desired, either or both of the plates 80 and 82 may have cemented or otherwise secured thereto a suitable intensifier screen such as the screen 102 which has been shown as being applied to the inside face of the back plate 80 in Figs. 3, 4 and 5.

As best seen in Fig. 4, the X-ray film 20 is adapted to be sandwiched between the intensifier screen 102 and front plate 82 when the two hingedly connected sections of the cassette are closed upon each other. The back plate 80 and front plate 82 are formed with respective holes 104 and 106 therein, which holes are centrally disposed in their respective plates and are adapted to extend in alignment when the sections are folded upon each other. The hole 104 has centered therein a flanged ferrule 108 while the hole 106 has similarly centered therein a flanged ferrule 110 of slightly smaller dimensions than the ferrule 108 so that when the two sections are closed upon each other the ferrule 106 projects in telescopic fashion into the ferrule 104 and provides a light-excluding seal around the two holes. The intensifier screen 102 is formed with a central hole 112 and the film 114 is formed with the previously mentioned central hole 18 therein. The forward regions of the ferrule 108 project through the three holes 104, 112 and 18 and thus the ferrule may serve as a centering member for maintaining the film 20 and intensifier screen 102 in exact register, as well as for maintaining the film centered within the closed cassette assembly so that the hole 18 therein is in register with the collimator tube 16.

The cassette assembly further includes a generally U-shaped retaining frame member 120 which is best seen in Fig. 5. This member is channel shape in transverse cross section and includes a pair of parallel side arms 122 and 124 respectively which are connected together by a transverse base member 126. The channel-shaped side members 122 and 124 present opposed inwardly facing guideways 128 and 130 in which the side edges of the folded film and plate assembly previously described are adapted to be slidingly received. The channel-shaped base member 126, in effect, provides an upwardly facing pocket 132 adapted to receive the lower edges 88 and 96 of the folded structure when the latter is moved to its home position within the retaining frame 120 as clearly shown in Fig. 3. The length of the two members 122 and 124 is slightly greater than the longitudinal or vertical extent of the plates 80 and 82 so that when the folded plates with the film sandwiched therebetween are inserted within the frame-like structure 120 and slid to their home position as shown in Fig. 3, the distal ends of the members 122 and 124 will project beyond the upper hinged edges 90 and 98 of the plates 80 and 82 respectively.

As shown in Fig. 3, various indicia may be applied to the outside face of the plate 82, the application being made with a suitable X-ray impervious substance so that the indicia will be photographed upon the film at the time of each X-ray exposure. In accordance with the back reflection X-ray method of crystal orientation shown and described in my above-mentioned copending application Serial No. 669,492, lines which have been designated at 140 and 142 and which may represent the phi and beta axes of the X-ray pattern are shown as being applied to the plate 82. Additionally a serial number such as the number "21" and designated at 144 may also be applied to the plate 82 for photographing on the film 20. This latter indicia mark may correspond to a similar mark on one of the dops 50 which supports the particular diamond about to be X-rayed and its back reflection pattern photographed on the film 20.

In the use of the cassette assembly 24 and holder 26, after the film 20 has been enclosed within the folder between the intensifying screen 102 and front plate 82 so that the film folder may be slipped into the U-shaped frame 120 and moved to its home position therein wherein the bottom of the folder extends into the channel groove 132 and wherein the distal ends of the frame sides 122 and 124 project upwardly above the hinge 100. The sides of the channels 128 and 130 serve to exclude light from entering the assembly and the fact that the sides 122 and 124 overhang the upper edge of the folder is a further safeguard against the entrance of light into the assembly. The thus assembled folder and frame may then be slid into position within the channel 66 and 68 so that the interfitting telescopically arranged ferrules 108 and 110 register with the nipple 76 and collimator tube 16 carried by the supporting plate 64 of the holder 26. Assuming the diamond D on the dop 50 to be in alignment with the collimator tube 16, nipple 76 and ferrules 108 and 110, in proper position for photographing, the X-ray exposure is made and immediately thereafter the entire cassette assembly 24 may be manually lifted or slid upwardly and removed from the channels 66 and 68 and taken to the dark room for developing operations. The ease with which the various cassettes may be introduced into and removed from the holder 26 enables rapid-succession exposure of a number of films which have been serially numbered to correspond with the numbering of corresponding dops so that the films may be developed simultaneously after selection of a day's quota of diamonds to be mounted, for example in normal shop procedure.

From the above description it is thought that the construction, use and many advantages of the herein described cassette and cassette holder will be readily understood. The invention is not to be limited to the exact arrangement of parts shown in the accompanying drawings or described in the specification since various changes in the details of construction may be resorted to without departing from the spirit of the invention. Only insofar

Having thus described the invention what I claim as new and desire to secure by Letters Patent is:

1. In a back reflection camera construction, in combination, a cassette adapted to contain a centrally apertured X-ray sensitive film and operatively position the same between an X-ray emitting tube and a crystal to be photographed so that a beam of X-rays may pass forwardly through the film aperture, strike the crystal and be reflected rearwardly onto the film for exposure purposes, said cassette comprising a folder comprising flat rectangular front and back plates respectively, each formed of light-impervious material, a light-impervious hinge extending along and connecting a pair of adjacent edge regions of said plates for swinging movements of the plates relative to each other between an open position of the folder wherein the plates are separated and a closed position of the folder wherein the plates are disposed in parallelism and close proximity to each other, there being a hole in each plate centrally thereof and designed for register with the film aperture when the folder is closed over the film, and a generally rectangular U-shaped frame-like retainer for the closed folder, said retainer having parallel sides and a connecting base member, said sides and base member being channel shape in transverse cross section with the channels thereof presented inwardly of the retainer, the end of the retainer remote from said connecting base member being open whereby the closed folder may be slid into said retainer through said open end with the channels encompassing the edge regions of three sides of the folder.

2. In a back reflection camera construction, the combination set forth in claim 1 wherein the parallel sides of said retainer are of greater extent than the extent of the folder whereby the distal ends of said retainer sides overhang the adjacent edges of the closed folder and exclude light from the interior thereof.

3. In a back reflection camera construction, the combination set forth in claim 1 wherein said light-impervious hinge is in the form of an elongated flat strip of flexible material adhesively secured to the outside surfaces of said adjacent edge regions of the plates and substantially coextensive therewith.

4. In a back reflection camera construction, the combination set forth in claim 1 including, additionally, an open-ended tubular ferrule telescopically received in each hole of said plates, said ferrules fitting one within the other when the folder is closed with the thus assembled ferrules being adapted to project through the film aperture.

5. In a back reflection camera construction, the combination set forth in claim 4 wherein the ferrule in the hole provided in said back plate encompasses the ferrule in the hole provided in the front plate with the former ferrule being adapted to project completely through the film aperture.

6. In a back reflection camera construction, the combination set forth in claim 4 including, additionally, an intensifier screen secured to the inside face of one of said plates and substantially coextensive therewith, said screen being formed with a central aperture therethrough and through which aperture the assembled ferrules project when the folder is closed.

7. In a back reflection camera construction, the combination set forth in claim 1 wherein said front plate has engraved thereon intersecting fiducial lines representing the crystal axes of a crystal.

8. In a back reflection camera construction, the combination set forth in claim 7 wherein said front plate has engraved thereon intersecting fiducial lines representing the crystal axes of a crystal and an indicia symbol representing an arbitrary crystal designation.

9. In a back reflection camera construction, in combination, a cassette adapted to contain a centrally apertured X-ray sensitive film and operatively position the same between an X-ray emitting tube and a crystal to be photographed so that a beam of X-rays may pass forwardly through the film aperture, strike the crystal and be reflected rearwardly onto the film for exposure purposes, a folder comprising flat rectangular front and back plates respectively, each formed of light-impervious material, a light-impervious hinge extending along and connecting a pair of adjacent edge regions of said plates for swinging movements of the plates relative to each other between an open position of the folder wherein the plates are separated and a closed position of the folder wherein the plates are disposed in parallelism and close proximity to each other, there being a hole in each plate centrally thereof and designed for register with the film aperture when the folder is closed over the film, and a generally rectangular U-shaped frame-like retainer for the closed folder, said retainer having parallel sides and a connecting base member, said sides and base member being channel shape in transverse cross section with the channels thereof presented inwardly of the retainer, the end of the retainer remote from said connecting base member being open whereby the closed folder may be slid into said retainer through said open end with the channels encompassing the edge regions of three sides of the folder, a holder for said cassette comprising an imperforate backing plate of X-ray impervious material against which the closed folder is adapted to be positioned in face-to-face relation, there being a hole in said backing plate designed for registry with the holes in said front and back plates when the folder is so positioned against said backing plate, and means for releasably retaining said folder in position against said backing plate.

10. In a back reflection camera construction, the combination set forth in claim 9 wherein said retaining means comprises a pair of opposed channel guides on the backing plate having open ends for sliding reception of the folder in said guides.

11. In a back reflection camera construction, the combination set forth in claim 9 including, additionally, a tubular nipple telescopically received within the hole provided in said backing plate, and an open-ended collimator tube having one open end thereof telescopically received in said nipple, said nipple constituting the sole support for said collimator tube.

References Cited in the file of this patent

UNITED STATES PATENTS

| | | |
|---|---|---|
| 2,380,236 | Harker | July 10, 1945 |
| 2,417,657 | McLachlan | Mar. 18, 1947 |
| 2,430,969 | Young | Nov. 18, 1947 |
| 2,590,892 | Rueter | Apr. 1, 1952 |
| 2,624,846 | Tochilin et al. | Jan. 6, 1953 |
| 2,780,730 | Frohman et al. | Feb. 5, 1957 |

FOREIGN PATENTS

| | | |
|---|---|---|
| 684,282 | Germany | Nov. 25, 1939 |